(12) United States Patent
Sarnowski et al.

(10) Patent No.: US 7,859,245 B2
(45) Date of Patent: Dec. 28, 2010

(54) APPARATUS, SYSTEM AND METHOD FOR OUTPUTTING A VITAL OUTPUT FOR A PROCESSOR

(75) Inventors: Mark F. Sarnowski, Cranberry Township, PA (US); Kevin N. Wahila, Pittsburgh, PA (US)

(73) Assignee: Ansaldo STS USA, Inc., Pittsburgh, PA (US)

( * ) Notice: Subject to any disclaimer, the term of this patent is extended or adjusted under 35 U.S.C. 154(b) by 138 days.

(21) Appl. No.: 12/430,221

(22) Filed: Apr. 27, 2009

(65) Prior Publication Data

US 2010/0270987 A1    Oct. 28, 2010

(51) Int. Cl.
F02P 3/02 (2006.01)
(52) U.S. Cl. .................................................... 323/371
(58) Field of Classification Search ................. 323/282, 323/371
See application file for complete search history.

(56) References Cited

U.S. PATENT DOCUMENTS

| | | | |
|---|---|---|---|
| 4,517,673 A | 5/1985 | Brown et al. | |
| 5,984,504 A | 11/1999 | Doyle et al. | |
| 6,938,183 B2 | 8/2005 | Bickel | |
| 7,088,803 B2 | 8/2006 | Rahamim et al. | |
| 7,167,022 B1 | 1/2007 | Schleicher et al. | |
| 7,176,715 B1 | 2/2007 | LeBlanc | |
| 7,328,369 B2 | 2/2008 | Manoni | |
| 7,408,381 B1 | 8/2008 | Drimer et al. | |
| 7,437,605 B2 | 10/2008 | Blevins, Sr. | |
| 2002/0158618 A1* | 10/2002 | Hiraki et al. | 323/371 |
| 2006/0117234 A1 | 6/2006 | Miyake et al. | |
| 2006/0164061 A1* | 7/2006 | Formenti et al. | 323/371 |
| 2006/0265540 A1 | 11/2006 | Mass et al. | |
| 2007/0220367 A1 | 9/2007 | Smith et al. | |
| 2008/0058962 A1 | 3/2008 | Ward | |
| 2008/0157720 A1* | 7/2008 | Yang | 323/371 |
| 2008/0163000 A1 | 7/2008 | McKim et al. | |
| 2008/0183306 A1 | 7/2008 | Ashraf et al. | |
| 2009/0167575 A1* | 7/2009 | Mitani et al. | 323/371 |

* cited by examiner

*Primary Examiner*—Bao Q Vu
*Assistant Examiner*—Jue Zhang
(74) *Attorney, Agent, or Firm*—Eckert Seamans Cherin & Mellott, LLC; Kirk D. Houser, Esquire

(57) ABSTRACT

An apparatus outputs a vital output for a processor including an output state. The apparatus includes a first input receiving the output state, two independent circuits each of which includes a second input electrically interconnected with the first input, a third input, a fourth input and an output including the output state. Each of the independent circuits repetitively monitors the output and the third and fourth inputs of a corresponding one of the independent circuits to confirm agreement therebetween. Each of two switches is controlled by the output of the corresponding one of the independent circuits. The switches cooperate to form the vital output. Each of two feedback circuits is between the output and the third input of the corresponding one of the independent circuits, and also between the output of the corresponding one of the independent circuits and the fourth input of the other one of the independent circuits.

27 Claims, 5 Drawing Sheets

APPARATUS, SYSTEM AND METHOD FOR OUTPUTTING A VITAL OUTPUT FOR A PROCESSOR

BACKGROUND

1. Field

The disclosed concept pertains generally to vital outputs and, more particularly, to apparatus that output a number of vital outputs for a processor. The disclosed concept also pertains to systems and methods that output a number of vital outputs for a processor.

2. Background Information

Many known control systems operate from a main controlling central processing unit (CPU), which communicates to distributed input/output (I/O) points on either a serial or a parallel bus configuration. In safety critical control systems, diagnostics can be applied by the controlling CPU to each distributed I/O point to ensure data integrity and safe system operation.

Known modem control equipment can respond to momentary stimulus or pulsed control energy. A non-limiting example of such control equipment for the railroad industry is a pneumatic switch machine. Until recently, control energy in vital systems was required to never be falsely energized for more than one second. More recently, it is required that vital control outputs never fail in an energized state.

It is known to provide diagnostics on an I/O board for a system CPU. For example, the I/O board employs an "echo register". On each session that the system CPU has with the I/O board, several steps occur. First, the I/O board's echo register is read. The echo register is a register that gets written to on every read or write to the I/O board regardless of what register is being accessed. This register complements the last data read or written and holds the complemented data. On the next access, the echo register is read first and the complemented data from the last access is expected. This ensures data integrity.

As another example, the I/O board employs a "type register". On each session the system CPU has with the I/O board, the I/O board's type register is read. The type register is a fixed number assigned to each type of board. The system CPU knows what boards are installed and their address, and expects to see those boards in the system each time it needs to access them.

As a further example, the I/O board employs output diagnostics. For example, diverse voltage sources and diverse resistor dividers form specific voltages on first inputs to comparator amplifiers. For example, 0.75 VDC (for a 12 VDC system (or 1.5 VDC for a 24 VDC system) is the level below which a vital output is guaranteed to be off. After separate diverse voltage dividers are switched into the set of comparators on their other inputs, the comparators are checked to ensure proper operation and that they properly indicate an on state or off state. Then, the actual outputs are switched through the comparators to measure them as being on or off. Next, each output is toggled by the system CPU to ensure that they all remain dynamic and are not stuck on or off. These diagnostics toggle two outputs at a time and are performed about every 100 ms. Given system loading and the inherent delay of dropping a vital cut off relay (VCOR) coil, there is a small possibility for an output to be in a falsely energized state for up to about one second. This one second criteria arose from the fact that traditional railroad switch machines would not or could not attempt to move their points in one second or less. Also, traditional cab signal equipment would not respond to code changes in less than one second; hence, a falsely energized output for less than one second was accepted.

It is believed that it is not feasible to ensure that vital control outputs never fail in an energized state by implementing changes to known diagnostics of safety critical control systems. For example, it is believed that the logistics of implementing a hypothetical retrofit program to the known diagnostics of safety critical control systems are not feasible or are impossible in view of the potential lack of the available processing power of the controlling CPU. For example, if some form of a hypothetical new diagnostic were to be applied to a system from a system executive standpoint (e.g., software changes), then current processor timing and system loading might prove too much for the additional diagnostic tasks.

There is room for improvement in apparatus for outputting a vital output for a processor.

There is also room for improvement in systems and methods for outputting a vital output for a processor.

SUMMARY

These needs and others are met by embodiments of the disclosed concept, which provide two independent circuits between a processor and two or more switches that turn a number of vital outputs on and off. The two independent circuits can advantageously cooperate and provide local diagnostics for the desired vital output state independent of the processor.

In accordance with one aspect of the disclosed concept, an apparatus for outputting a vital output for a processor including an output state comprises: a first input structured to receive the output state from the processor; two independent circuits, each of the two independent circuits comprising a second input electrically interconnected with the first input, a third input, a fourth input and an output including the output state from the processor, each of the two independent circuits being structured to repetitively monitor the output and the third and fourth inputs of a corresponding one of the two independent circuits to confirm agreement therebetween; two switches, each of the two switches being controlled by the output of the corresponding one of the two independent circuits, the two switches cooperating to form the vital output; and two feedback circuits, each of the two feedback circuits being between the output and the third input of the corresponding one of the two independent circuits, and also being between the output of the corresponding one of the two independent circuits and the fourth input of the other one of the two independent circuits.

Each of the two independent circuits may be further structured to increment an error counter if the output of the corresponding one of the two independent circuits does not agree with both of the third and fourth inputs of the corresponding one of the two independent circuits.

The output of the corresponding one of the two independent circuits may be a first output; each of the two independent circuits may further comprise a second output to the processor; and each of the two independent circuits may be further structured to disable the second output if the error counter is incremented above a predetermined count.

Each of the two independent circuits may be further structured to disable the output of the corresponding one of the two independent circuits if the error counter is incremented above a predetermined count.

Each of the two feedback circuits may be an isolation barrier structured to prevent the third input of the corresponding one of the two independent circuits and the fourth input of the other one of the two independent circuits from affecting the output of the corresponding one of the two independent circuits.

Each of the two independent circuits may be further structured to repetitively compare the output and the third and fourth inputs of the corresponding one of the two independent circuits to confirm agreement therebetween at a predetermined rate, and to confirm disagreement therebetween if a predetermined count of consecutive disagreements occurs.

As another aspect of the disclosed concept, a system for outputting a vital output comprises: a processor including an output state; and an apparatus comprising: a first input inputting the output state from the processor, two independent circuits, each of the two independent circuits comprising a second input electrically interconnected with the first input, a third input, a fourth input and an output including the output state from the processor, each of the two independent circuits repetitively monitor the output and the third and fourth inputs of a corresponding one of the two independent circuits to confirm agreement therebetween, two switches, each of the two switches being controlled by the output of the corresponding one of the two independent circuits, the two switches cooperating to form the vital output, and two feedback circuits, each of the two feedback circuits being between the output and the third input of the corresponding one of the two independent circuits, and also being between the output of the corresponding one of the two independent circuits and the fourth input of the other one of the two independent circuits.

As another aspect of the disclosed concept, a method of outputting a vital output comprises: outputting an output state from a processor; for each of two independent circuits: inputting a first input of the output state from the processor, inputting a second input and a third input, repetitively monitoring the first, second and third inputs of a corresponding one of the two independent circuits to confirm agreement therebetween, and outputting an output of the output state from the processor; forming the vital output with two switches; controlling each of the two switches with the output of the corresponding one of the two independent circuits; feeding back the output of the corresponding one of the two independent circuits to the second input of the corresponding one of the two independent circuits; and feeding back the output of the corresponding one of the two independent circuits to the third input of the other one of the two independent circuits.

The method may further comprise incrementing an error counter if the output of the corresponding one of the two independent circuits does not agree with both of the second and third inputs of the corresponding one of the two independent circuits; and disabling the vital output if the error counter is incremented above a predetermined count.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" means a programmable analog and/or digital device that can store, retrieve, and process data; a computer; a workstation; a personal computer; a microprocessor; a microcontroller; a microcomputer; a central processing unit (CPU); a mainframe computer; a mini-computer; a server; a networked processor; an on-board computer; a controlling device, such as a system CPU; or any suitable processing device or apparatus.

As employed herein, the term "vital" or "vitally" means that the acceptable probability of a hazardous event resulting from an abnormal outcome associated with a corresponding activity or thing is less than about $10^{-9}$/hour. Alternatively, the mean time between hazardous events is greater than $10^9$ hours.

As employed herein, the term "complex programmable logic device (CPLD)" means a programmable logic device with complexity between that of programmable array logic (PAL) devices and field-programmable gate arrays (FPGAs), and may include architectural features of both.

As employed herein, the term "diverse" means composed of distinct or unlike elements or qualities. For example, a CPLD made by one vendor (e.g., without limitation, Altera Corporation) is diverse from a different CPLD made by a different vendor (e.g., without limitation, Xilinx, Inc.). As an additional example, the logic synthesis and place and route tools of different vendors utilize diverse algorithms to implement CPLD designs. However, for example, a processor made by one vendor (e.g., an 8086 made by Intel®) is not diverse from a plug-compatible, second source processor made by a different vendor (e.g., an 8086 made by AMD®).

The disclosed concept is described in association with apparatus and systems outputting a number of vital outputs, although the disclosed concept is applicable to apparatus and systems outputting a number of vital outputs and inputting a number of inputs.

Figure 1:
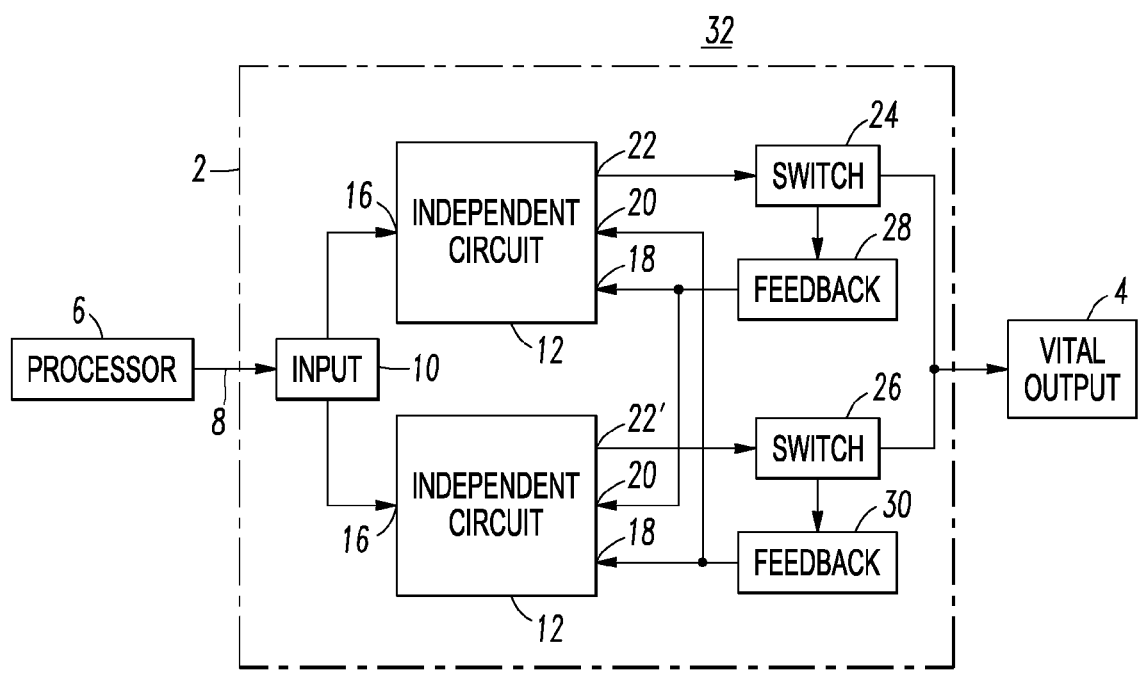
FIG. 1 is a block diagram of a system in accordance with embodiments of the disclosed concept.

Referring to FIG. 1, an apparatus 2 outputs a vital output 4 for a processor 6 including an output state 8. The apparatus 2 includes a first input 10 structured to receive the output state 8 from the processor 6. The apparatus 2 also includes two independent circuits 12,14, each of which includes a second input 16 electrically interconnected with the first input 10, a third input 18, a fourth input 20 and a corresponding output 22 or 22' including the output state 8 from the processor 6. Each of the two independent circuits 12,14 is structured to repetitively monitor the corresponding output 22,22' and the third and fourth inputs 18,20 of a corresponding one of the two independent circuits 12,14 to confirm agreement therebetween. The apparatus 2 further includes two switches 24,26, each of which is controlled by the corresponding output 22,22' of the corresponding one of the two independent circuits 12,14. The two switches 24,26 cooperate to form the vital output 4. The apparatus 2 also includes two feedback circuits 28,30, each of which is between the corresponding output 22,22' and the third input 18 of the corresponding one of the two independent circuits 12,14, and is also between the corresponding output 22,22' of the corresponding one of the two independent circuits 12,14 and the fourth input 20 of the other one of the two independent circuits 12,14.

A system 32 for outputting the vital output 4 includes the processor 6 and the apparatus 2.

A method of outputting the vital output 4 includes outputting the output state 8 from the processor 6. Each of the two independent circuits 12,14 inputs a first input (e.g., at input 10) of the output state 8 from the processor 6, inputs a second input (e.g., at input 18) and a third input (e.g., at input 20), repetitively monitors such first, second and third inputs of a corresponding one of the two independent circuits 12,14 to confirm agreement therebetween, and outputs the corresponding output 22,22' of the output state 8 from the processor 6. The vital output 4 is formed with the two switches 24,26. Each of the two switches 24,26 is controlled with the corresponding output 22,22' of the corresponding one of the two independent circuits 12,14. The corresponding output 22,22' of the corresponding one of the two independent circuits 12,14 is fed back (e.g., by feedback circuits 28,30) to such second input of the corresponding one of the two independent circuits 12,14. Also, the corresponding output 22,22' of the corresponding one of the two independent circuits 12,14 is fed back to such third input of the other one of the two independent circuits 12,14.

EXAMPLE 1

The two independent circuits 12,14 of FIG. 1 can be, for example and without limitation, programmable hardware devices, such as complex programmable logic devices (CPLDs). Preferably, in order to improve the probability of avoiding a hazardous event in connection with the vital output 4, each of the two independent circuits 12,14 is a diverse programmable hardware device. Preferably, the use of diverse CPLDs provides diverse synthesis and place and route design tools and limits potential common mode failures.

EXAMPLE 2

The two example feedback circuits 28,30, can be, for example and without limitation, isolation barriers (e.g., without limitation, a magnetic isolation barrier; any suitable isolation barrier such that the input of one of the independent circuits 12,14 does not affect the output of the other independent circuit) structured to prevent the third and fourth inputs 18,20 from affecting the corresponding output 22,22'.

As a non-limiting example, a magnetic isolator employs a built-in data refresh function to sense a steady-state signal. Magnetic isolation can be provided by a suitable digital isolator integrated circuit (IC) (e.g., without limitation, ADUM1400, marketed by Analog Devices, Inc. of Norwood, Mass.). Since the input signal to be isolated can potentially be in a static state for an extended period of time, a digital isolator IC receives a logic level input and generates an internal, time varying signal so that a magnetic structure (not shown) does not saturate. Across this magnetic barrier, the IC then creates a logic level output. Preferably, if there is more than one vital output 4, then the IC preferably includes plural (e.g., without limitation, four) channels of isolation. Hence, this can provide isolation for multiple isolation channels.

Other suitable isolation barriers can include, for example and without limitation, optical isolators, optocouplers, and capacitive couplers.

EXAMPLE 3

The two example switches 24,26, can be, for example and without limitation, diverse switches, such as diverse FETs, which reduce common mode failures.

Figure 3:
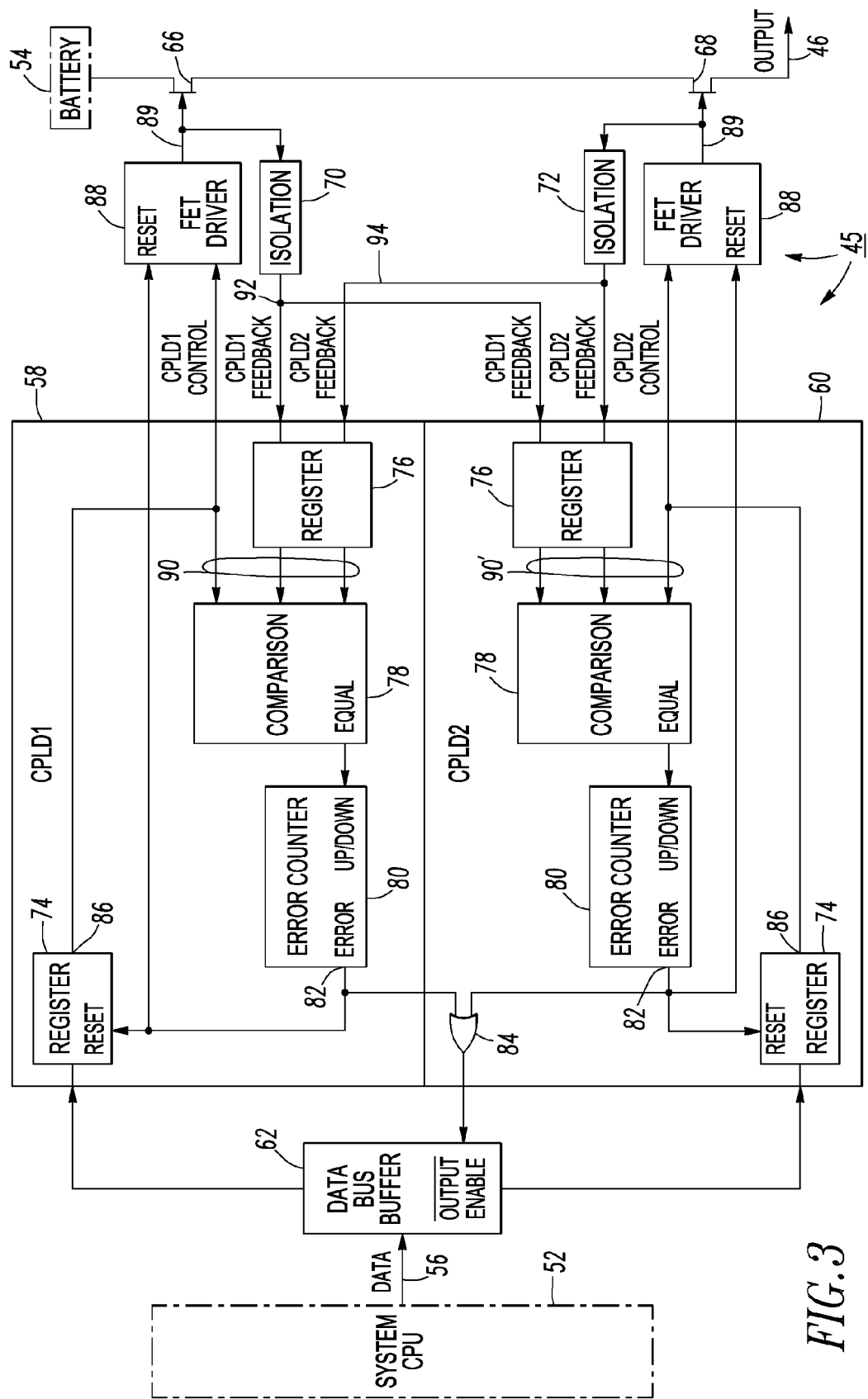
FIG. 3 is a block diagram of the two diverse complex programmable logic devices (CPLDs) of FIG. 2.

Preferably, the diverse switches are electrically connected in series to form the vital output 4. For example, as is shown in FIG. 3, each of the two example diverse FETs 66,68 includes an output, which is ANDed with the output of the other of the two diverse FETs 66,68 to form the vital output 46.

EXAMPLE 4

Figure 2:
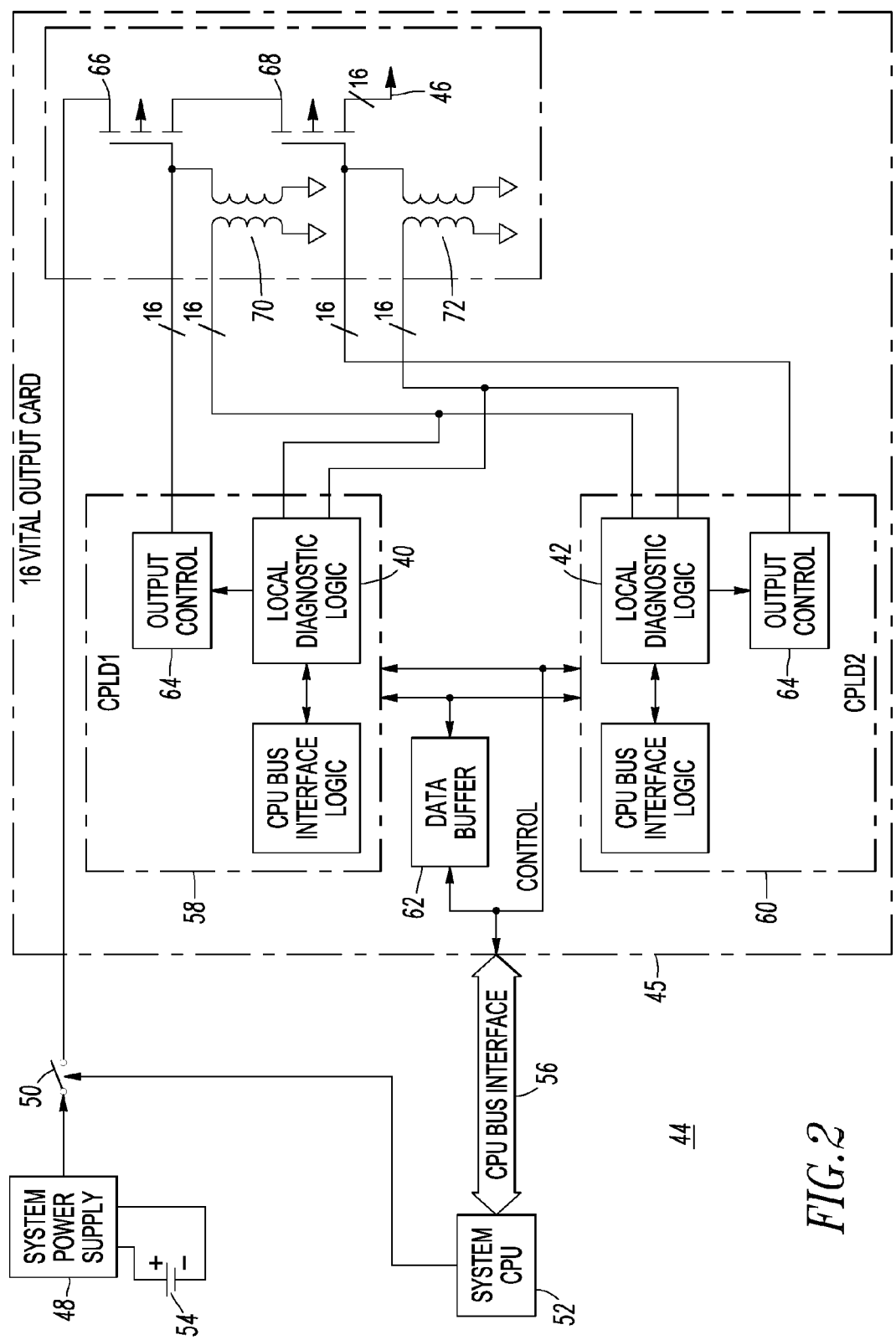
FIG. 2 is a block diagram of a system in accordance with another embodiment of the disclosed concept.

Referring to FIG. 2, the placement of local diagnostics 40,42 within an example MICROLOK® II system 44 is shown. The local diagnostics 40,42 are preferably implemented through programmable hardware, which applies the local diagnostic approach in a flexible manner and permits these local diagnostics to be tailored to various systems and interfaces to processors, such as the system CPU 52. This provides a hardware-only solution.

The system CPU 52 can be, for example and without limitation, a Microlok® II processor. The example system CPU 52 and example MICROLOK® II system 44 are marketed by Ansaldo STS USA, Inc. of Pittsburgh, Pa.

Although a MICROLOK® II system 44 and a Microlok® II processor are shown, the disclosed concept is applicable to any suitable processor, such as an example central processing unit (CPU), for any suitable corresponding system. The example MICROLOK® II system 44 employs a number of flexible two-out-of-two vital outputs 46, and a suitable system power supply 48. Independent of the local diagnostics 40,42, the example MICROLOK® II system 44 includes a vital cut off relay (VCOR) 50, which is controlled by the system CPU 52 and supplies vital energy to the vital outputs 46 from the system battery 54 (e.g., without limitation, 12 VDC; 24 VDC; any suitable voltage), and which is responsible for de-energizing the vital outputs 46 if a diagnostic fails.

The example CPU bus interface 56 permits various conventional diagnostics (e.g., echo and type register checks) to be performed, and also, feeds into the local diagnostics 40,42 of two independent, and preferably diverse, complex programmable logic devices 58,60 (CPLD1 and CPLD2).

Each of the local diagnostics 40,42 is placed in the system 44 between the system CPU 52 and the number of vital outputs 46 (e.g., one, two or more). In the example embodiment, there can be up to 16 different vital outputs 46, although the disclosed concept is applicable to any suitable number of vital outputs (e.g., less than 16; greater than 16). The system CPU 52 can, in and of itself, de-energize any of the vital outputs 46 by de-energizing the VCOR 50. Furthermore, the local diagnostics 40,42 can also de-energize the vital outputs 46 in response to potential failures resulting in one or more control signals of the vital outputs 46 being falsely energized for less than about 1 ms. It will be appreciated, however, that any suitable time of the local diagnostics 40,42 different than 1 ms can be employed. For example and without limitation, the local diagnostics 40,42 can be tailored to other targeted responses as well, such as a time period of less than 0.5 ms or any suitable time.

In this example, the system 44 can correspond to the system 32 of FIG. 1. Similarly, the system CPU 52 can correspond to the processor 6, a data buffer 62 can correspond to the first input 10, the CPLDs 58,60 can correspond to the independent circuits 12,14, the output controls 64 can correspond to the corresponding output 22,22', two FETs 66,68 and two FET drivers 88 can correspond to the two switches 24,26, the number of vital outputs 46 can correspond to the vital output 4, and two isolation barriers 70,72 can correspond to the two feedback circuits 28,30.

The apparatus 45 of FIG. 2, which may also include a number of inputs (not shown), includes (as shown in FIG. 3) the data bus buffer 62, the two diverse CPLDs 58,60, the two FET drivers 88, the two isolation barriers 70,72 (e.g., without limitation, magnetic), and the two diverse FETs 66,68. The two diverse FETs 66,68 are electrically connected in series between the battery 54 (shown in phantom line drawing in FIG. 3) and the corresponding vital output 46 (e.g., without limitation, which drives a vital lamp (not shown)). The diverse CPLDs 58,60 and diverse FETs 66,68 cooperatively control vital output energy to the vital output 46.

EXAMPLE 5

FIG. 3 shows that each of the example CPLDs 58,60 includes an input/output register 74, an input register 76, a comparison function 78 and an error counter 80. For example, if the three signals 90,90' to the respective CPLDs 58,60 do not agree, then the corresponding error counter 80 is incremented. If this error condition persists, then the vital output 46 is shut off (e.g., to ensure a safe state of the vital output) and communication with the system CPU 52 is terminated within, for example, 1 ms, which corresponds to a predetermined count and a predetermined clock rate of the error counters 80.

The outputs 82 of the error counters 80 are employed through OR gate 84 to disable outputs from the data bus buffer 62 back to the system CPU 52 (e.g., in order to turn off communication with the system CPU 52), to reset the output 86 of the input registers 74, and to reset the output of driver circuits, such as the example FET drivers 88.

The example switches 24,26 of FIG. 1 can be, for example and without limitation, the FET switches 66,68 and the FET drivers 88 of FIG. 2. The example FET drivers 88 each have an output 89 that is input by the corresponding one of the isolation barriers 70,72.

As will be described, each of the two independent CPLDs 58,60 can increment the corresponding error counter 80 if the corresponding three signals 90,90' do not agree (e.g., if the corresponding output to the corresponding FET driver 88 does not agree with feedback signals 92,94). Each of the two isolation barriers 70,72 is between the output 89 of the corresponding FET driver 88 and the corresponding one of the feedback signals 92,94. The three signals 90 for the first CPLD 58 include the output 86 of the corresponding input/output register 74, the output 92 of the isolation barrier 70, and the output 94 of the other isolation barrier 72. Similarly, the three signals 90' for the second CPLD 60 include the output 86 of the corresponding input/output register 74, the output 94 of the isolation barrier 72, and the output 92 of the other isolation barrier 70. If the error persists and the error counter 80 reaches a predetermined count, then all vital outputs 46 are disabled (e.g., shut off) by disabling the corresponding FET driver 88 and communication with the system CPU 52 is terminated by disabling the data bus buffer 62. Also, the output 86 of the corresponding input/output register 74 is reset to a safe state (e.g., without limitation, off; zero). The time for an error to be declared is preferably less than about 1 ms.

The comparison function 78 includes two programmable logic functions: (1) comparison logic (not shown); and (2) comparison control logic (not shown). The example comparison logic takes three pairs of 8-bit vectors (e.g., for 8 vital outputs 46) and compares them using conventional comparators. The vectors that are compared are masked representations of the commanded output state (e.g., the output 86 of the input/output register 74) and the associated isolated feedback signal 92 (shown as CPLD1 Feedback) for the first (e.g., without limitation, Altera) CPLD 58 and the associated isolated feedback signal 94 (shown as CPLD2 Feedback) for the second (e.g., without limitation, Xilinx) CPLD 60. The comparison of this commanded output state with the isolated feedback signals 92,94 from the CPLDs 58,60 forms the basis of the local diagnostics 40,42 (FIG. 2).

EXAMPLE 6

Each of the CPLDs 58,60 knows the state commanded by the system CPU 52. Each of the CPLDs 58,60 also gets isolated feedback from the FET driver 88 that it is driving and the FET driver 88 that the other CPLD is driving. As will be discussed, each of the two independent CPLDs 58,60 repetitively compares the state commanded by the system CPU 52 and the isolated feedback from the two FET drivers 88 to confirm agreement therebetween at a predetermined rate, and to confirm disagreement therebetween if a predetermined count of consecutive disagreements occurs.

These three pieces of information are compared on each clock cycle and the error counter 80 is incremented when they do not agree. A non-limiting example clock period, about 31.25 ns (corresponding to about a 32 MHz clock rate), is employed to calculate how many consecutive errors can occur within the desired time to indicate an error. In this example, up to about 32,000 consecutive errors in comparison occur before an error condition exists. Additionally, consecutive comparisons that produce the correct result are used to decrement the error counter 80. Each of the CPLDs 58,60 independently monitors the states of the outputs 92,94 of the respective isolation barriers 70,72 and the commanded state of the output to the corresponding FET driver 88, and each of the CPLDs 58,60 has the ability to independently shut off the vital output 46 through reset of the corresponding FET driver 88.

The monitoring algorithm is executed independently on each of the independent CPLDs 58,60. The commanded output state from the system CPU 52 is held in the input/output register 74 within each of the CPLDs 58,60. This register 74 is updated every time the system CPU 52 commands the output to be in a new state. Furthermore, even if the system CPU 52 only wishes to change the state of a single vital output 46, the register 74 is updated (or refreshed) for every vital output 46. Similarly, the isolated feedbacks from the FET drivers 88 are held in the input register 76 within each of the CPLDs 58,60. The input/output register 74 is updated every system clock cycle. Hence, each of the two independent CPLDs 58,60 can continuously monitor the respective three signals 90,90' to confirm agreement therebetween.

EXAMPLE 7

Although the monitoring algorithm preferably runs continuously, there can be, for example, periods of time when comparison is temporarily disabled. For example, any time the system CPU 52 commands the outputs 86 to be in a new state, the comparison is preferably held off to allow for settling time of the feedback from the FET drivers 88 (e.g., in the order of microseconds). If the comparison were not disabled, then the algorithm would be comparing new commanded output states with old feedback.

Several factors determine when the comparison logic of the comparison function 78 should be enabled. First, comparison is not enabled whenever the outputs are being written to through the data bus buffer 62 and the input/output register 74. Second, the comparison enable accounts for delay that exists for the feedback from each of the diverse CPLDs 58,60 to be available for comparison. As a non-limiting example, feedback from an example Xilinx CPLD takes relatively much longer to be valid than feedback from an example Altera CPLD. The comparison control logic applies a mask to the data being compared, in order that comparison can start after either a short comparison delay or a long comparison delay. Regardless of whether or not all outputs 86 change in the same way (e.g., by masking out bits that may be subject to the long comparison delay), the bits subject to the short comparison delay can be compared relatively sooner.

The following shows what is compared by three comparators (not shown) of the comparison logic. For the short delay comparison enable: (1) p1 and q1; and (2) p2 and q2 are compared. For the long delay comparison enable, p3 and q3 are compared;

wherein:
p1 is current commanded output state;
q1 is feedback from the example Altera CPLD;
p2 is a short delay, masked version of the current commanded output state;
q2 is a short delay, masked version of the example Xilinx CPLD feedback;
p3 is a long delay, masked version of the current commanded output state; and
q3 is a long delay, masked version of the example Xilinx CPLD feedback.

The outputs from any of the three comparators can cause the error counter 80 to increment, thereby flagging an error if the predetermined error count is exceeded.

The comparison control logic generates comparison enable signals (not shown) used by the three comparators (not shown) in the comparison logic. Comparison is not enabled during a write to the outputs 86, and is held off for either a short delay or a long delay, as determined by the comparison control logic. Comparison is delayed to provide the correct amount of time for feedback signals to propagate through the CPLDs 58,60.

EXAMPLE 8

From the external perspective of the CPU bus interface 56 of FIGS. 2 and 3, the disclosed apparatus 45 (e.g., without limitation, a vital output card) appears like a conventional vital output card. Therefore, the entire external bus interface at the data bus buffer 62 is the same; however, the additional, local diagnostics 40,42, the comparison function 78 and the error counter 80 are unknown to the system CPU 52 and are believed to be novel. Safety of operation, by shutting off the vital outputs 46 within, for example and without limitation, about 1 ms, is provided. The only way that the system CPU 52 knows there is a problem is because the apparatus 45 cut off communication with the system CPU 52. As a result, the system CPU 52 resets the system 44. While the system CPU 52 responds with a normal, relatively slow, processing time (e.g., about every 100 ms), the example apparatus 45 provides a relatively fast reaction (e.g., about 1 ms) to errors and eliminates hazards at the source. By having the CPU bus interface 56 be unchanged and divorcing its operation from the local diagnostics 40,42, the disclosed apparatus 45 gains flexibility to be applied in a generic sense.

EXAMPLE 9

Further to Example 6, the predetermined rate can be 32 MHz and the predetermined count can be 32,000. In this example, disagreement between the three signals 90,90' can be confirmed in 1 ms.

EXAMPLE 10

Figure 4A:
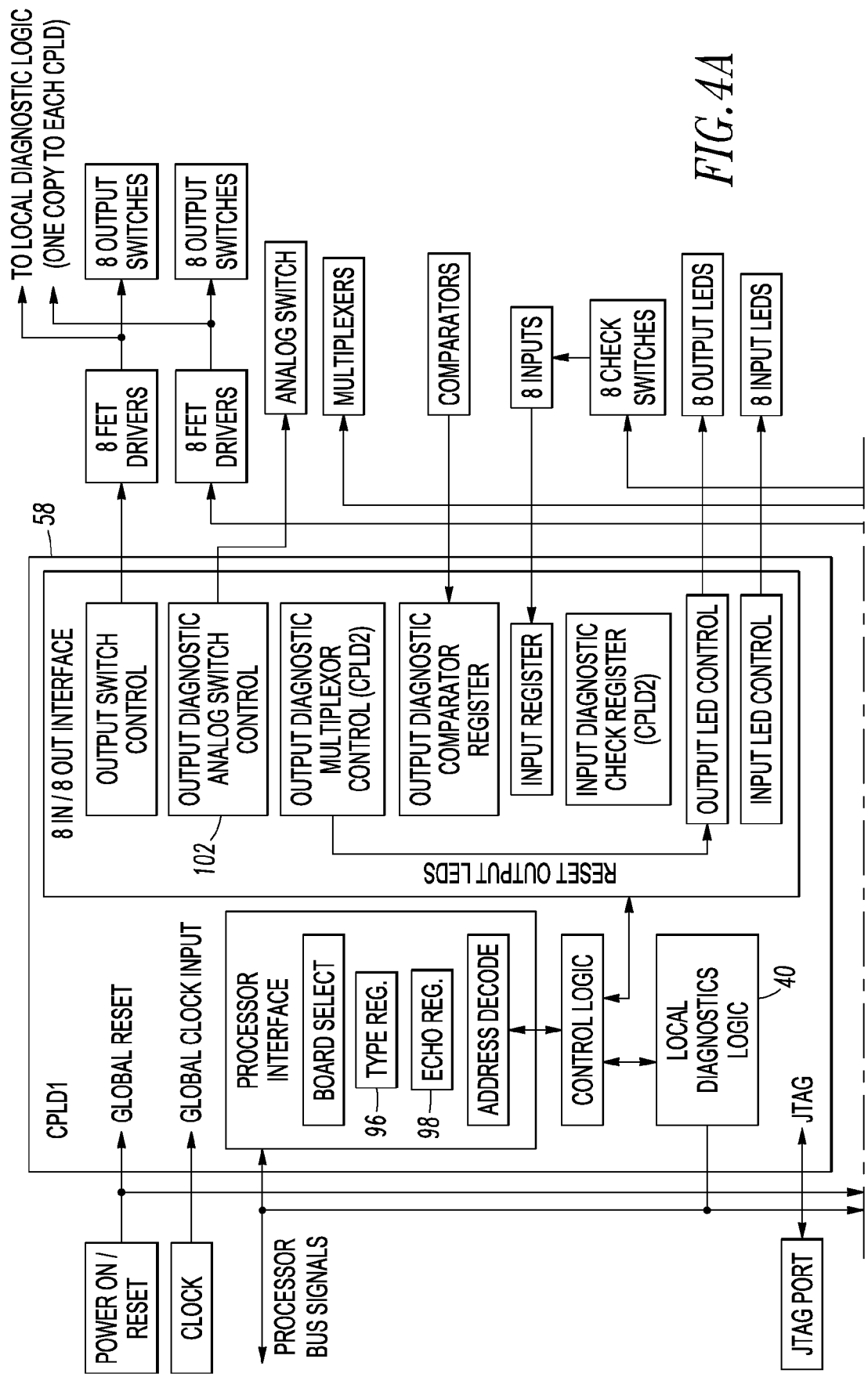
FIGS. 4A-4B form a relatively more detailed block diagram of the two diverse complex programmable logic devices (CPLDs) of FIG. 2.
Figure 4B:
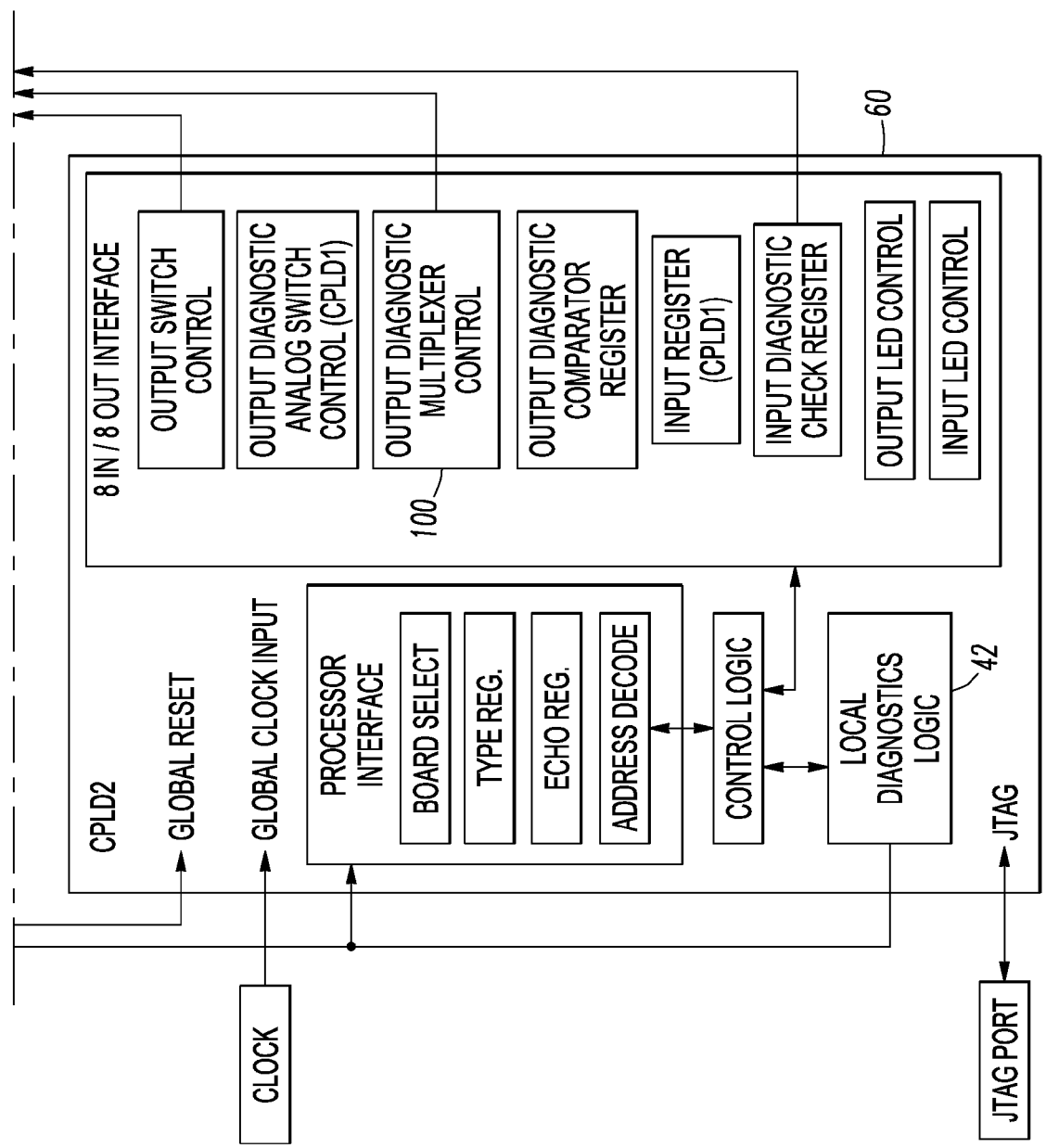

FIGS. 4A-4B show a relatively more detailed, example block diagram of possible functions implemented in each of the two diverse CPLDs 58,60. For example, some of the system diagnostic functions can be split between the two CPLDs 58,60, in order that both of the CPLDs 58,60 operate to complete these functions. For example, the conventional type register 96, the conventional echo register 98 and the conventional output diagnostic analog switch control 102 are part of CPLD 58, while the CPLD 60 includes the conventional output diagnostic multiplexer control 100. The registers 96,98, for example, can be output to the system CPU 52 through the input/output register 74. This is an example of how the system CPU 52 attempts to perform non-local diagnostics. The CPLD 60 disables the input/output register 74 with the output of the OR gate 84 (FIG. 3) being true when one or both of the error counters 80 is incremented above the predetermined count. This disables the data bus buffer 62 (FIG. 3). Hence, a failure of the access to the apparatus 45 by the system CPU 52 indicates an error thereto in, for example and without limitation, about 100 ms, which is the example period of the non-local diagnostics being performed by the system CPU 52.

EXAMPLE 11

The disclosed apparatus 45 of FIG. 2 preferably provides a standalone, two-out-of-two voting architecture, class 2 (e.g., reactive fail safety; a device that detects an event and reacts fast enough to fix it well within a predetermined time using a suitable processor, such as a processing and/or logical device, that checks system status through feedback) apparatus. The disclosed local diagnostics 40,42 provide a simple, standalone, two-out-of-two class 2 system for implementing a number of vital outputs 46.

For example, diverse CPLDs 58,60 control respective diverse FETs 66,68 to ultimately control vital output energy. Each of the CPLDs 58,60 checks its own control outputs (from output control 64 (FIG. 2)) and the outputs from the corresponding CPLD, and each of the CPLDs 58,60 can independently de-energize a vital output 46. The disclosed local diagnostics 40,42 advantageously flexibly fit into the system 44 and provide a supplemental check to existing non-local diagnostics.

The disclosed local diagnostics 40,42 advantageously provide a "plug and play" approach that ensures no additional tasks for the system CPU 52. For example, all local diagnostics are provided by the apparatus 45 for the system CPU 52 while improving the system safety level. The local diagnostics 40,42 divorce the system CPU 52 from the hypothetical extra loading of performing such diagnostics, while maintaining a very maintainable implementation (e.g., a "plug and play" seamless implementation).

In order to ensure system safety and to protect against random and common mode faults, redundancy is applied, as well as diversity, in both the local diagnostics 40,42 and with the diverse CPLDs 58,60 that ultimately, through the FET drivers 88, turn the vital output energy to the diverse FETs 66,68 on and off. This provides a flexible solution for adding, in this example, local diagnostic capabilities to ensure a SIL-4 safety level based on the example 1 ms timing of the error counters 80. With this approach, there are no system software changes and no system wiring changes. Also, there is "plug and play" ease of installation, a reduced upgrade time, and reduced testing.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An apparatus for outputting a vital output for a processor including an output state, said apparatus comprising:
a first input structured to receive the output state from said processor;
two independent circuits, each of said two independent circuits comprising a second input electrically interconnected with said first input, a third input, a fourth input and an output including the output state from said processor, each of said two independent circuits being structured to repetitively monitor the output and the third and fourth inputs of a corresponding one of said two independent circuits to confirm agreement therebetween;
two switches, each of said two switches being controlled by the output of the corresponding one of said two independent circuits, said two switches cooperating to form said vital output; and
two feedback circuits, each of said two feedback circuits being between the output and the third input of the corresponding one of said two independent circuits, and also being between the output of the corresponding one of said two independent circuits and the fourth input of the other one of said two independent circuits.

2. The apparatus of claim 1 wherein each of said two independent circuits is further structured to increment an error counter if the output of the corresponding one of said two independent circuits does not agree with both of the third and fourth inputs of the corresponding one of said two independent circuits.

3. The apparatus of claim 2 wherein the output of the corresponding one of said two independent circuits is a first output; wherein each of said two independent circuits further comprises a second output to said processor; and wherein each of said two independent circuits is further structured to disable said second output if said error counter is incremented above a predetermined count.

4. The apparatus of claim 2 wherein each of said two independent circuits is further structured to disable the output of the corresponding one of said two independent circuits if said error counter is incremented above a predetermined count.

5. The apparatus of claim 4 wherein the output of the corresponding one of said two independent circuits is a first output; wherein each of said two independent circuits further comprises a second output to said processor; and wherein each of said two independent circuits is further structured to disable said second output if said error counter is incremented above said predetermined count.

6. The apparatus of claim 1 wherein each of said two independent circuits is further structured to continuously monitor the output and the third and fourth inputs of the corresponding one of said two independent circuits to confirm agreement therebetween.

7. The apparatus of claim 1 wherein each of said two independent circuits is a programmable hardware device.

8. The apparatus of claim 1 wherein each of said two independent circuits is a diverse programmable hardware device.

9. The apparatus of claim 1 wherein each of said two feedback circuits is an isolation barrier structured to prevent the third input of the corresponding one of said two independent circuits and the fourth input of the other one of said two independent circuits from affecting the output of the corresponding one of said two independent circuits.

10. The apparatus of claim 1 wherein each of said two independent circuits is a complex programmable logic device.

11. The apparatus of claim 1 wherein each of said two independent circuits is a diverse programmable hardware device; and wherein each of said two switches is a diverse switch.

12. The apparatus of claim 1 wherein said apparatus is further structured to provide a standalone, two-out-of-two, class 2 apparatus.

13. The apparatus of claim 1 wherein each of said two independent circuits is a diverse complex programmable logic device; and wherein each of said two switches is a diverse FET.

14. The apparatus of claim 1 wherein each of said two independent circuits is further structured to repetitively compare the output and the third and fourth inputs of the corresponding one of said two independent circuits to confirm agreement therebetween at a predetermined rate, and to confirm disagreement therebetween if a predetermined count of consecutive disagreements occurs.

15. The apparatus of claim 14 wherein said predetermined rate is about 32 MHz; wherein said predetermined count is about 32,000; and wherein said disagreement is confirmed in about 1 ms.

16. The apparatus of claim 1 wherein each of said two switches includes an output, which is ANDed with the output of the other of said two switches to form said vital output.

17. A system for outputting a vital output, said system comprising:
a processor including an output state; and
an apparatus comprising:
a first input inputting the output state from said processor,
two independent circuits, each of said two independent circuits comprising a second input electrically interconnected with said first input, a third input, a fourth input and an output including the output state from said processor, each of said two independent circuits repetitively monitoring the output and the third and fourth inputs of a corresponding one of said two independent circuits to confirm agreement therebetween,
two switches, each of said two switches being controlled by the output of the corresponding one of said two independent circuits, said two switches cooperating to form said vital output, and
two feedback circuits, each of said two feedback circuits being between the output and the third input of the corresponding one of said two independent circuits, and also being between the output of the corresponding one of said two independent circuits and the fourth input of the other one of said two independent circuits.

18. The system of claim 17 wherein each of said two independent circuits increments an error counter if the output of the corresponding one of said two independent circuits does not agree with both of the third and fourth inputs of the corresponding one of said two independent circuits.

19. The system of claim 18 wherein the output of the corresponding one of said two independent circuits is a first output; wherein each of said two independent circuits further comprises a second output to said processor; and wherein each of said two independent circuits disables said second output if said error counter is incremented above a predetermined count.

20. The system of claim 17 wherein each of said two feedback circuits is an isolation barrier structured to prevent the third input of the corresponding one of said two independent circuits and the fourth input of the other one of said two independent circuits from affecting the output of the corresponding one of said two independent circuits.

21. The system of claim 17 wherein each of said two switches comprises a driver circuit including an output and an output circuit controlled by the output of the driver circuit.

22. The system of claim 21 wherein each of said two independent circuits increments an error counter if the output of the corresponding one of said two independent circuits does not agree with both of the third and fourth inputs of the corresponding one of said two independent circuits.

23. The system of claim 22 wherein each of said two feedback circuits is between the output of the driver circuit and the third input of the corresponding one of said two independent circuits, and also between the output of the driver circuit and the fourth input of the other one of said two independent circuits.

24. The system of claim 22 wherein each of said two independent circuits disables the output of the driver circuit of the corresponding one of said two independent circuits if said error counter is incremented above a predetermined count.

25. A method of outputting a vital output, said method comprising:
outputting an output state from a processor;
for each of two independent circuits:
inputting a first input of the output state from said processor,
inputting a second input and a third input,
repetitively monitoring the first, second and third inputs of a corresponding one of said two independent circuits to confirm agreement therebetween, and
outputting an output of the output state from said processor;
forming said vital output with two switches;
controlling each of said two switches with the output of the corresponding one of said two independent circuits;
feeding back the output of the corresponding one of said two independent circuits to the second input of the corresponding one of said two independent circuits; and
feeding back the output of the corresponding one of said two independent circuits to the third input of the other one of said two independent circuits.

26. The method of claim 25 further comprising:
employing an isolation barrier between the output and the second input of the corresponding one of said two independent circuits, and also between the output and the third input of the other one of said two independent circuits.

27. The method of claim 25 further comprising:
incrementing an error counter if the output of the corresponding one of said two independent circuits does not agree with both of the second and third inputs of the corresponding one of said two independent circuits; and
disabling said vital output if said error counter is incremented above a predetermined count.

* * * * *

UNITED STATES PATENT AND TRADEMARK OFFICE
CERTIFICATE OF CORRECTION

Page 1 of 1

PATENT NO. : 7,859,245 B2
APPLICATION NO. : 12/430221
DATED : December 28, 2010
INVENTOR(S) : Mark F. Sarnowski et al.

It is certified that error appears in the above-identified patent and that said Letters Patent is hereby corrected as shown below:

Column 1, line 21, "modem" should read --modern--.
Column 4, line 33, "Intel®" should read --Intel®--.
Column 4, line 35, "AMD®" should read --AMD®--.
Column 6, line 8, "AMD®" should read --AMD®--.
Column 6, line 16, "MICROLOK® II" should read --MICROLOK®II--.
Column 6, line 17, "MICROLOK® II" should read --MICROLOK®II--.
Column 6, line 19, "MICROLOK® II" should read --MICROLOK®II--.
Column 6, line 23, "MICROLOK® II" should read --MICROLOK®II--.
Column 6, line 26, "MICROLOK® II" should read --MICROLOK®II--.
Column 10, line 34, "standal-" should read --stand- --.
Column 10, line 35, "one," should read --alone,--.

Signed and Sealed this
Thirteenth Day of December, 2011

David J. Kappos
*Director of the United States Patent and Trademark Office*